Jan. 18, 1955      G. A. GOEPFRICH      2,699,915

VALVE BRACKET

Filed Dec. 29, 1953

INVENTOR.
GEORGE A. GOEPFRICH

BY
Lindsey and Prutzman
ATTORNEYS

United States Patent Office 2,699,915
Patented Jan. 18, 1955

2,699,915

VALVE BRACKET

George A. Goepfrich, New Britain, Conn., assignor to The Skinner Chuck Company, New Britain, Conn., a corporation of Connecticut Application December 29, 1953, Serial No. 400,925

2 Claims. (Cl. 251—121)

The present invention relates to readily dismemberable valve assemblies and more particularly to an improved arrangement for securely retaining a readily dismemberable valve in assembled condition during operation, while permitting swift and easy disassembly when desired for cleaning, repair or replacement.

Readily dismemberable valves of the type with which the present invention is particularly suitable are often used in controlling flow of fluids for human consumption such as, for example, beverages in coin-operated beverage dispensing machines. In such applications, sanitary considerations are, of course, of the highest importance, and, for this reason, the valves are especially constructed so as to be easily disassembled, particularly for cleaning purposes. The cleaning may be performed either at the point of use of the valve or the valves may be removed for cleaning at some central station and replaced with a unit previously cleaned and sterilized. In any event, it is desirable that the valves can be disconnected from their associated apparatus quickly and easily, by unskilled personnel. With this consideration in mind, valve assemblies have been designed which are extremely simple and easy to disconnect and to disassemble. As might be expected, however, the more simple and readily dismemberable is the valve, the greater is the likelihood that disassembly or dismemberment of the structure may take place inadvertently due to manipulation of the apparatus with which the valve is used, pressure of the fluid handled by the valve, careless or improper assembly, etc. It is the principal object of the present invention to provide an arrangement of improved simplicity for insuring that inadvertent disassembly of any portion of such valves will be prevented until such time as it is actually desired, yet when disconnection and disassembly is desired, allowing it to be effected quickly and easily by unskilled personnel.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing, Figure 1 is a partly sectionalized view of a valve assembly of the type with which the present invention is particularly suitable, showing one embodiment of the present invention employed thereon;

Figure 1:
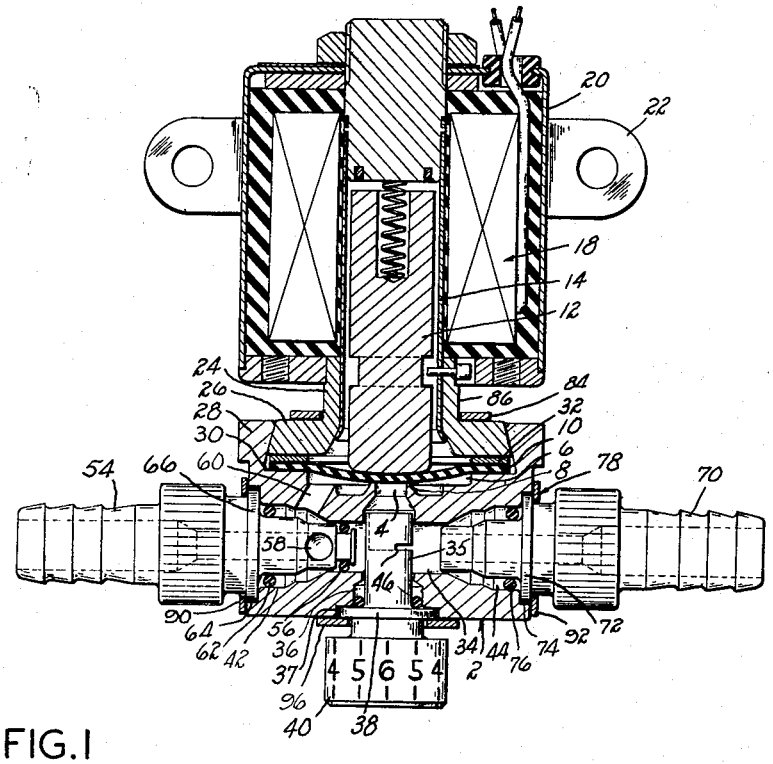

An exemplary valve assembly of the type with which the present invention is particularly suitable is shown in Figure 1 of the drawing and includes a casing 2 within which is a flow passage 4 communicating at one end with a valve chamber 6. At the intersection of flow passage 4 and valve chamber 6 is a valve seat 8. The passage 4 is closed at valve seat 8 by a valve in the form of a flexible diaphragm 10 actuated by an armature or plunger 12 reciprocated in a sleeve 14 in accordance with electrical signals supplied to a valving fixture in the form of an electromagnet assembly 18. The electromagnet assembly 18 is enclosed within a housing 20 provided with lugs 22 for supporting the entire assembly on the machine in which it is used.

The housing of electromagnet assembly 18 is provided with a neck 24 having pairs of diametrically opposed feet 26, which are adapted to be inserted within and rotated under corresponding pairs of diametrically opposed flanges 28 on casing 2, and thereby serve to support the valve casing 2 on the electromagnet assembly 18. Diaphragm 10 is supported at its periphery on an annular shelf 30, against which it is compressed by a backing ring 32 pressed home by feet 26 as the valve casing 2 is connected onto the electromagnet assembly 18. Thus the resilience of diaphragm 10 insures that the valve casing 2 will be firmly clamped to housing 20, yet by merely twisting the flanges 28 relative to feet 26 the valve casing 2 can be dismounted from the electromagnet assembly 18. The above-described structure forms no part of the present invention, and is similar in arrangement to that described in my Patent 2,619,986.

The casing 2 is also provided with a straight throughbore 34 intersecting flow passage 4. Bisecting throughbore 34 is a metering control 35, which is seated at its inner end in flow passage 4, and extends outside the casing 2 through a control chamber 36 in casing 2 coaxial with flow passage 4. Chamber 36 is counterbored at 37 to receive a flange 38 on control 35. Flange 38 is overlapped by a pin 39 in casing 2 to properly position the control 35 in casing 2. At its outer end control 35 is provided with a calibrated setting knob 40.

Throughbore 34 is counterbored at its ends to provide an inlet passage 42 and an outlet passage 44. The inner end of control 35 is hollow and connects passage 4 with outlet passage 44 through a slot 46 which wipes the inner end of outlet passage 44 and presents an aperture thereto whose size can be varied by rotating control 35. Supported within the inlet passage 42 in casing 2 is an inlet nozzle 54, the inner end of which carries an annular seal 56, preferably of round cross section and constructed of resilient material, which prevents direct flow of fluid from the inlet passage to outlet passage 44. Adjacent its inner end the inlet nozzle 54 is provided with a radial aperture 58 opening into inlet passage 42. Inlet passage 42 is connected to valve chamber 6 by means of a duct 60. Adjacent the outer end of inlet passage 42, the inlet nozzle 54 is provided with another seal 62, which prevents leakage of fluid from the valve casing 2. At its outer end the inlet passage 42 is provided with an annular counterbore 64 to receive a flange 66 provided on inlet nozzle 54. When inlet nozzle 54 is inserted into the valve casing the proper amount to correctly position seal 62 and seal 56 in inlet passage 42, the inner side of flange 66 abuts the bottom of counterbore 64 and the outer side of the flange is flush with the outside of the casing 2.

The outlet passage 44 is likewise provided with an outlet nozzle 70, which has a flange 72 received within a counterbore 74 in casing 2 and carries a seal 76 for preventing leakage from the outlet passage. Like the inlet nozzle 54, the outlet nozzle 70 is properly positioned within casing 2 by bottoming of flange 72 in counterbore 74, which renders the outside of the flange 72 flush with the outside of casing 2.

In order to disassemble the structure above described for repair or replacement, or for complete cleaning of each portion of the valve with which the beverage might come in contact, it is merely necessary to twist the casing 2 to unlock feet 26 from flanges 28, which uncouples the valve from the electromagnet assembly 18 proper, and then to pull the inlet and outlet nozzles and the metering control out of the casing against the friction exerted by their respective seals, in the manner of extracting a cork. The valve is then completely disassembled and ready for cleaning of all of its beverage contacting surfaces.

It will be apparent from the simplicity of the above disassembly procedure, however, that, if the pressure of the fluid being handled by the valve is very high, the friction forces provided by the seals will be overcome, the inlet and outlet nozzles and the metering control will be susceptible of being forced out of the valve casing by the fluid pressure, and the system will have to be shut down. Moreover, if through inadvertence, the valve casing is allowed to rotate relative to the electromagnet housing, feet 26 are likely to uncouple from flange 28, and this too will rupture the system and will require a shutdown.

To insure against inadvertent disassembly of the valve at any of the above disconnecting points without compromising the highly advantageous features above described of straight through passageways, easy-to-manage parts, and fixtures of the simple press-in, pull-out type, there is provided in accordance with the present invention a retaining bracket 78 of one-piece construction, which is adapted to slip over the valve and be secured thereon by a single thumbscrew, and when installed serves to retain the input and output nozzles and the control firmly in place, and prevents the casing from uncoupling from the electromagnet assembly.

Figure 2:
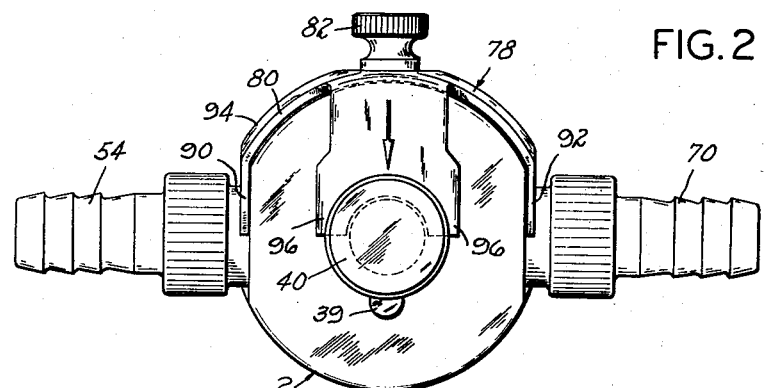
Figure 2 is a front end view of the structure shown in Figure 1.
Figure 3:
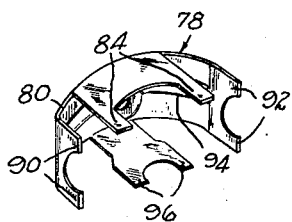
Figure 3 is a perspective view to a reduced scale of a portion of the structure shown in Figures 1 and 2 constructed in accordance with the present invention.

The bracket 78 is particularly shown in Figures 2 and 3, and consists of a web or panel 80 which is generally semi-cylindrical in shape, and is curved to fit closely over the top of the valve casing 2. Web 80 is detachably secured to casing 2 by a thumbscrew 82 received in a threaded hole therein. From the back side edge of web 80 depends a pair of legs 84 whose inner sides are flat and parallel, and whose spacing is such that they fit snugly around the neck 24 of housing 20 and contact corresponding flats 86 provided on neck 24. With this arrangement the inner sides of legs 84 firmly grip flats 86 and prevent the valve casing 2 from being rotated relative to neck 24, so that inadvertent disconnection of the valve casing from the electromagnet 18 is positively prevented.

From the left side of web 80 depends a pair of claws 90 which are so spaced as to fit smoothly around the inlet nozzle 54 and abut the outer side of flange 66, thus retaining the flange securely in its proper position flush with the outside of casing 2, and properly positioning inlet nozzle 54 in the casing to prevent rupture or leakage even though nozzle 54 may be rotated in the inlet passage during use of the valve. At its right side web 80 has a pair of claws 92 which surround outlet nozzle 70 and likewise clamp flange 72 securely in counterbore 74. Web 80 is also provided with an upraised strengthening rib 94 pressed therein, to prevent spreading of claws 92 away from claws 90 and loosening of inlet nozzle 54 or outlet nozzle 70. From the front side of web 80 depends a pair of claws 96 which are properly spaced to fit around the metering control 35 and provide a safety feature for pin 39 in retaining flange 38 firmly in counterbore 37.

Thus it may be seen that the bracket of the present invention provides a simple unitary structure which positively insures that all the quick-disconnect points on the valve assembly are firmly secured against the effects of fluid pressure, or rotation of the various fixtures connected to the valve casing. Yet when it is desired to disconnect and disassemble the valve for cleaning or replacement, this operation can be performed quickly and simply by unskilled personnel by the simple expedient of unloosening thumbscrew 82 and lifting the bracket off casing 2, whereupon the inlet, outlet, and control fixtures may, like corks, be manually pulled directly out of the casing, and the casing merely twisted to uncouple it from electromagnet.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a dismemberable valve assembly including a cylindrical valve casing provided with a diametrical throughbore counterbored at its ends to receive positioning flanges of inlet and outlet fixtures, and provided with an axial throughbore terminating at one end in a control chamber counterbored to receive a positioning flange of a control fixture, said axial throughbore terminating at its other end in a valve chamber having flange segments securing a twist-disconnect valving fixture therein, a bracket having a semi-cylindrical central web, a removable fastener for securing said web on said casing, a pair of spaced legs supported from one side of said web and embracing said valving fixture to prevent twisting thereof, respective pairs of spaced claws supported from the other sides of said web and overlapping the positioning flanges of said respective inlet, outlet and control fixtures to prevent displacement thereof from said counterbores, whereby said bracket accurately positions and securely retains said fixtures in assembled condition with said valve casing.

2. In a dismemberable valve assembly including a cylindrical valve casing provided with a diametrical throughbore terminating in inlet and outlet passages having inlet and outlet fixtures pressed therein, and provided with an axial throughbore terminating at one end in a control chamber having a control fixture pressed therein and terminating at its other end in a valving chamber having a twist-disconnect valving fixture secured therein, whereby said inlet, outlet, control and valving fixtures may be quickly manually detached from said valve casing, the improvement which comprises a bracket having a semi-cylindrical central web, a pair of spaced legs depending from one side of said web and positioned to embrace said valving fixture to prevent twisting thereof, and a plurality of pairs of spaced claws depending from the other sides of said web and positioned to embrace said inlet, outlet, and control fixtures to prevent displacement thereof from said casing, and a removable fastener for securing said web on said casing.

No references cited.